US 9,468,190 B2

(12) United States Patent
Duke

(10) Patent No.: US 9,468,190 B2
(45) Date of Patent: Oct. 18, 2016

(54) MILKING EQUIPMENT

(71) Applicant: AN UDDER IP COMPANY LTD, Slindon, Sussex (GB)

(72) Inventor: James Richard John Duke, Chichester (GB)

(73) Assignee: AN UDDER IP COMPANY LTD., Slindon, Sussex (GB)

( * ) Notice: Subject to any disclaimer, the term of this patent is extended or adjusted under 35 U.S.C. 154(b) by 44 days.

(21) Appl. No.: 14/413,903

(22) PCT Filed: Jul. 24, 2013

(86) PCT No.: PCT/GB2013/051979
§ 371 (c)(1),
(2) Date: Jan. 9, 2015

(87) PCT Pub. No.: WO2014/016596
PCT Pub. Date: Jan. 30, 2014

(65) Prior Publication Data
US 2015/0201577 A1    Jul. 23, 2015

(30) Foreign Application Priority Data
Jul. 25, 2012    (GB) .................................. 1213231.2

(51) Int. Cl.
*A01J 7/04*    (2006.01)
*A01J 7/02*    (2006.01)

(52) U.S. Cl.
CPC .. *A01J 7/04* (2013.01); *A01J 7/025* (2013.01)

(58) Field of Classification Search
CPC ............ A01J 7/025; A01J 7/04; A01J 7/022; A01J 7/02; A01J 7/00; A01J 5/08; A01J 5/007; A01J 5/04; A01J 5/048; A01J 5/16; A01J 5/047

USPC ......... 119/14.01, 14.02, 14.03, 14.07, 14.08, 119/14.14, 14.18, 14.36, 14.47, 14.55
See application file for complete search history.

(56) References Cited

U.S. PATENT DOCUMENTS 3,482,547 A    12/1969    Maier
3,630,081 A    12/1971    Nelson
(Continued)

FOREIGN PATENT DOCUMENTS

DE         261300        10/1988
EP        0 277 396       8/1988
(Continued)

OTHER PUBLICATIONS

Akam, D. N., *The Development of Equipment for the Mechanization of Manual Operations in Machine Milking*, Proceedings of the International Symposium on Machine Milking, 17th Annual Meeting National Mastitis Council, Inc., Feb. 1978, pp. 417-426.
(Continued)

*Primary Examiner* — Patrick Hawn
(74) *Attorney, Agent, or Firm* — Alston & Bird LLP

(57) ABSTRACT

There is provided a distributor device (22) for distributing treatment fluid to the teat cups of a milking cluster. The distributor device has at least one distributer inlet (18) for treatment fluid, at least one distributor outlet (20) for connection to a teat cup, and a safety valve The safety valve is selectively operable to permit flow between the at least one inlet (18) and the at least one outlet (20) and, in a rest position, to shut off flow between the at least one inlet and the at least one outlet and vent the at least one inlet to atmosphere.

10 Claims, 4 Drawing Sheets

(56) References Cited

U.S. PATENT DOCUMENTS

| | | | |
|---|---|---|---|
| 3,726,253 A | 4/1973 | Duncan | |
| 3,762,371 A | 10/1973 | Quayle et al. | |
| 3,789,798 A | 2/1974 | Reisgies et al. | |
| 3,861,355 A | 1/1975 | Johnson et al. | |
| 4,175,514 A | 11/1979 | Souza et al. | |
| 4,516,530 A | 5/1985 | Reisgies et al. | |
| 4,572,105 A | 2/1986 | Chowdhury et al. | |
| 4,593,649 A | 6/1986 | Britten | |
| 4,907,535 A | 3/1990 | Matsuzawa et al. | |
| 4,924,809 A | 5/1990 | Verbrugge | |
| 5,134,967 A | 8/1992 | Marshall | |
| 5,161,482 A | 11/1992 | Griffin | |
| 5,178,095 A | 1/1993 | Mein | |
| 5,218,924 A | 6/1993 | Thompson et al. | |
| 5,386,799 A | 2/1995 | Dietrich | |
| 5,881,669 A | 3/1999 | Van den Berg et al. | |
| 5,992,347 A | 11/1999 | Innings et al. | |
| 6,089,242 A | 7/2000 | Buck | |
| 6,267,077 B1 | 7/2001 | Van den Berg et al. | |
| 6,308,655 B1 | 10/2001 | Oosterling | |
| 6,561,126 B2 | 5/2003 | Forsen et al. | |
| 6,584,930 B2* | 7/2003 | Buecker | A01J 7/025 119/14.02 |
| 6,619,227 B1 | 9/2003 | Berger et al. | |
| 7,963,249 B2* | 6/2011 | Duke | A01J 5/08 119/14.02 |
| 8,025,029 B2* | 9/2011 | Torgerson | A01J 7/025 119/14.18 |
| 8,240,272 B2 | 8/2012 | Duke | |
| 8,342,125 B2* | 1/2013 | Torgerson | A01J 7/00 119/14.47 |
| 8,528,500 B2* | 9/2013 | Torgerson | A01J 7/025 119/14.47 |
| 8,590,486 B2* | 11/2013 | Torgerson | A01J 7/00 119/14.47 |
| 8,627,785 B2* | 1/2014 | Grace | A01J 5/08 119/14.36 |
| 8,770,146 B2* | 7/2014 | Buck | A01J 5/00 119/14.18 |
| 9,016,238 B2* | 4/2015 | Duke | A01J 5/08 119/14.51 |
| 9,049,835 B2* | 6/2015 | Duke | A01J 5/048 |
| 9,072,273 B2* | 7/2015 | Torgerson | A01J 7/04 |
| 2002/0088402 A1* | 7/2002 | Buecker | A01J 7/025 119/14.47 |
| 2007/0215053 A1 | 9/2007 | Duke | |
| 2010/0132626 A1* | 6/2010 | Torgerson | A01J 7/025 119/651 |
| 2010/0139723 A1* | 6/2010 | Torgerson | A01J 7/04 134/57 R |
| 2010/0154900 A1* | 6/2010 | Torgerson | A01J 7/00 137/511 |
| 2011/0220028 A1* | 9/2011 | Duke | A01J 5/08 119/14.02 |
| 2011/0232575 A1* | 9/2011 | Duke | A01J 5/08 119/14.02 |
| 2012/0017836 A1* | 1/2012 | Torgerson | A01J 5/007 119/14.08 |
| 2012/0118238 A1* | 5/2012 | Torgerson | A01J 7/04 119/14.18 |
| 2012/0272911 A1 | 11/2012 | Duke | |

FOREIGN PATENT DOCUMENTS

| | | |
|---|---|---|
| EP | 0 459 817 | 12/1991 |
| EP | 0543463 | 5/1993 |
| EP | 0 945 057 | 9/1999 |
| GB | 1 440 901 | 6/1976 |
| WO | WO 01/17338 | 3/2001 |
| WO | WO 02/23976 | 3/2002 |
| WO | WO 2005/022986 | 3/2005 |
| WO | WO 2005/043986 | 5/2005 |
| WO | WO 2005/072516 | 8/2005 |
| WO | WO 2005/102035 | 11/2005 |

OTHER PUBLICATIONS

Grindal, R. J. et al., *Automatic Application of Teat Disinfectant Through the Milking Machine Cluster*, Journal of Dairy Research, 56, 1989, pp. 579-585.

Thompson, P., et al., *The End-of Milking Sequence and Its Mechanization*; ASAE; 1976 Winter Meeting of the American Society of Agricultural Engineers; Dec. 14-17, 1976; pp. 1-15.

International Searching Authority, International Search Report and Written Opinion for International Application No. PCT/GB2013/051979, Nov. 14, 2013, 9 pages, European Patent Office, The Netherlands.

* cited by examiner

MILKING EQUIPMENT

CROSS REFERENCE TO RELATED APPLICATIONS

This application is a National Stage Application, filed under 35 U.S.C. §371, of International Application No. PCT/GB2013/051979, filed Jul. 24, 2013, which claims priority to Great Britain Application No. 1213231.2, filed Jul. 25, 2012, the contents of all of which as are hereby incorporated by reference in their entirety.

BACKGROUND

1. Related Field

The present invention relates to milking equipment and, more particularly, to a milking cluster of teat cups and a distributor device for mounting with the cluster and for distributing treatment fluid to the teat cups of the cluster, post milking.

2. Description of Related Art

Conventionally, milking equipment installed in a milking parlour comprises a milking point at each animal stall within the parlour. Each milking point includes a milking cluster of teat cups for connecting the milking equipment to the teats of an animal to be milked. In the case of cows, for example, each milking cluster has four teat cups. The cluster additionally comprises a claw or clawpiece which connects short pulse tubes and short milk tubes leading from the teat cups, respectively, to a long pulse tube coupled to a pulsator and a long milk tube connected to a milk collection system. Each teat cup comprises a rigid hollow shell supporting a resilient or flexible liner which has a barrel portion for engaging about a teat and which has, at its upper end, an head portion with a mouth through which the teat is engaged with the barrel of the liner. At the opposite discharge end of the teat cup, the liner communicates with a short milk tube which delivers milk extracted from an animal's teat to the claw where it is collected and delivered to the long milk tube. A short pulsator tube is connected, at one end, to the annular space or pulse chamber between the shell and the liner and, at its opposite end, is connected, via a device on the claw, to the long pulsation tube and a pulsator.

Upon commencement of milking, vacuum is applied to the teat cups of a milking cluster at each milking point via the long milk tube, the claw and the short milk tubes for the purposes of extracting milk from the teat cups. This vacuum also leaks between the barrel of each liner and the engaged teat and is applied to a void formed about the teat in the head of a liner in order to capture the cup on the teat. Milking is performed by automatically and alternately applying vacuum and atmospheric pressure pulses produced by the pulsator to the pulse chamber of each teat cup in order to flex the liner and stimulate discharge of milk from the engaged teat. It is customary to apply these pneumatic pulses alternately to pairs of teat cups of a cluster.

After completion of the milking cycle, the milking cluster at each milking point is withdrawn from the teats (commonly referred to as "take-off"), such as by an automatic cluster remover and, in a treatment and cleansing cycle, the teats are disinfected and the teat cup liners are flushed internally with disinfectant and water and are dried with compressed air. To this end, teat cups may be fitted with injection nozzles for injecting treatment fluids into the heads of the liners as described in international publication No. WO 2005/043986. The treatment fluid is fed to the injection nozzles via a distributor on the claw. Alternatively, or in addition, treatment fluids may be supplied to each teat cup via a back flush valve disposed at the discharge end of the teat cup. In either event, upon take-off, the milking cluster is designed to enable the short milk tubes to fall away from the centre line of the cluster so that the teat cups are inverted and hang with their heads downwardly from the claw in a rest position. Flushing may be performed with the teat cups in this rest position. Consequently, liquid can escape through the head portions of the teat cups.

Where treatment fluids are injected into the liners of the teat cups, post milking, for example, as described in the aforementioned international publication, the treatment fluid is delivered to the different teat cups of a milking cluster via a distributor on the claw and a safety valve, which is desirably included with the distributor, is provided to prevent treatment fluid entering the liners and contaminating the milk in the event of a control system malfunction. The safety valve provides protection against manifold valve malfunction during the milking cycle and ensures that, in the event of a malfunction which causes treatment fluid under pressure to be fed to the distributor, this is controlled by the safety valve. As described in international application No. WO 2005/102035, during the milking cycle, the safety valve is open to a drain port so that treatment fluid can flow to waste instead of risking the possibility of this treatment fluid contaminating the milk.

BRIEF SUMMARY

It is an object of the present invention to provide an improved distributor device for distributing treatment fluid to the teat cups of a milking cluster and which incorporates a safety valve which, in a rest position, shuts off the fluid flow of treatment fluid through the distributor and vents to atmosphere.

To this end, according to an aspect of the invention there is provided a distributor device for distributing treatment fluid to the teat cups of a milking cluster. The distributor device has at least one distributer inlet for treatment fluid, at least one distributor outlet for connection to a teat cup, and a safety valve. The safety valve is selectively operable to permit flow between the at least one inlet and the at least one outlet and, in a rest position, to shut off flow between the at least one inlet and the at least one outlet and vent the at least one inlet to atmosphere. Preferably, the safety valve is incorporated in the body of the distributor.

With the invention, the safety valve is in the rest position during the milking cycle and provides an atmospheric break. It shuts off treatment fluid flow between the inlet(s) and the outlet(s) and ensures that, in the event of a malfunction which causes treatment fluid under pressure to be fed to the distributor, the treatment fluid bleeds away through the atmospheric vent and flows to waste instead of risking the possibility of milk contamination.

In a preferred embodiment, the distributor includes a first passageway interconnecting the inlet(s) and the bleed port venting to atmosphere, a second passageway connecting with the distributor outlet(s) for delivering treatment fluid thereto, first and second valve ports disposed respectively between the first passageway and the bleed port and the first and second passageways, and valve means controlling the ports, said valve means opening the first valve port and closing the second valve port in the rest position of the valve means.

Conveniently, the valve means may comprise a movable valve body carrying at least one valve member cooperating with the first and second valve ports. A return spring may be arranged to resiliently urge and retain the valve body in the position in which said at least one valve member opens the first valve port and closes the second valve port, thereby shutting off fluid flow to the distributor outlet(s).

Advantageously, the movable valve body may comprise two back-to-back valve surfaces, one of which is engageable with a valve seat of the first valve port to close the first valve port, and the other of which is engageable with a valve seat of the second valve port to close the second valve port.

The distributor device may comprise two of the inlets and two of the outlets, and a distributor body having two inlet passageways and two outlet passageways. The two inlet passageways may extend from the two inlets and exit into the first passageway, and the two outlet passageways may extend from the two outlets and connect to the second passageway.

Furthermore, the two inlet passageways may be mutually parallel to one another, the two outlet passageways may be mutually parallel to one another, and the first and second passageways may be mutually parallel to one another and transverse to the inlet and outlet passageways.

The safety valve may comprise a valve bore extending transverse to the first and second passageways, and the movable valve body may be slidably mounted in the valve bore.

Advantageously, the movable valve body may be pneumatically actuatable. The movable valve body may comprise a piston that is actuable by compressed air to close the first valve port and open the second valve port.

BRIEF DESCRIPTION OF THE FIGURES

In order that the present invention may be more readily understood reference will now be made to the accompanying drawings, in which.

DETAILED DESCRIPTION OF VARIOUS EMBODIMENTS

Figure 1:
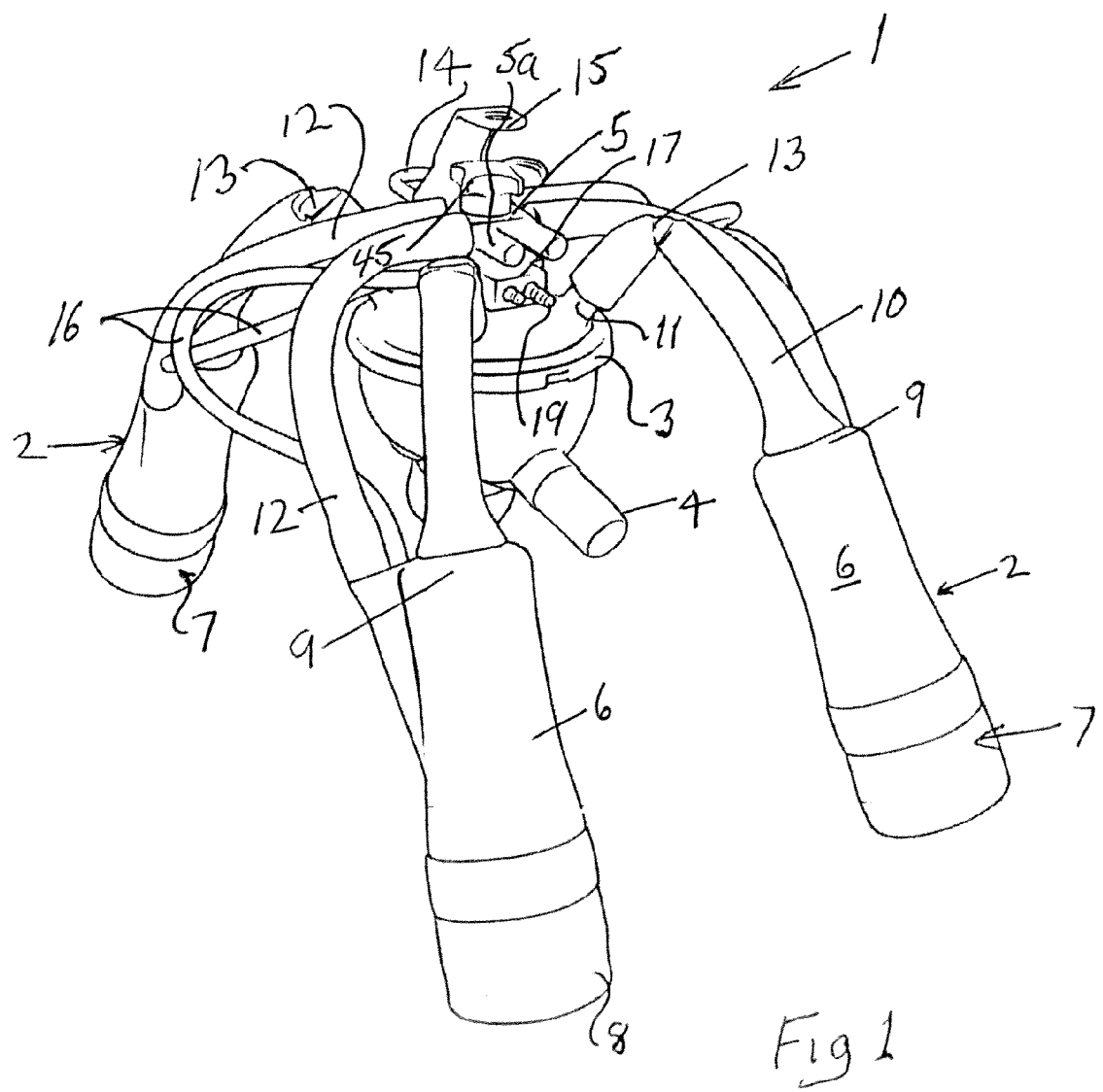
FIG. 1 is a perspective view from one side of a milking cluster of teat cups embodying the invention.
Figure 2:
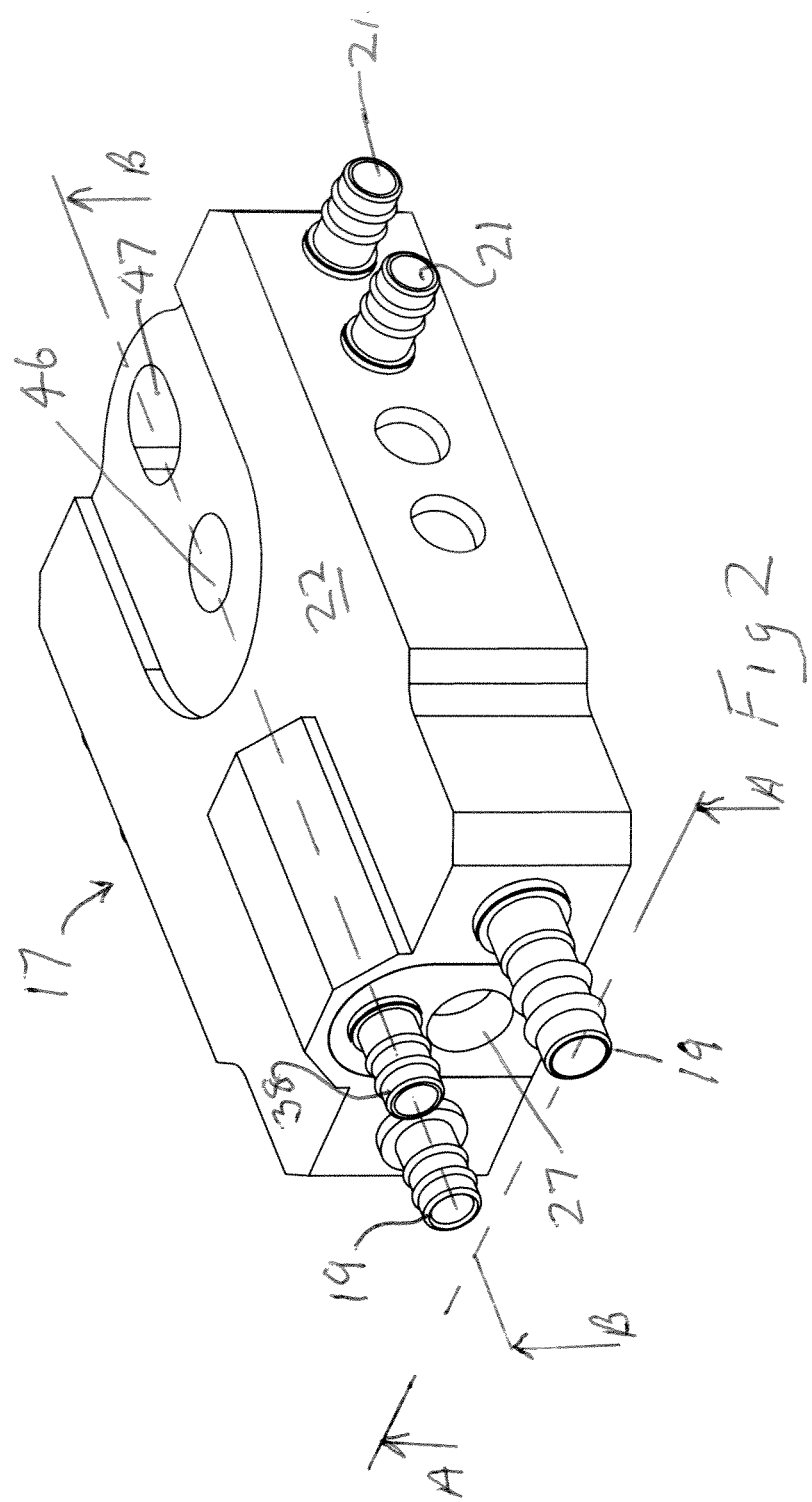
FIG. 2 is a perspective view of the treatment fluid distributor from above.

FIG. 1 of the accompanying drawings illustrates a milking cluster 1 of teat cups embodying the invention and for connecting milking equipment installed at a milking point of an animal stall within a milking parlour to the teats of an animal to be milked. It comprises four teat cups 2, a claw 3 having a nipple 4 for connecting the claw to a long milk tube (not shown) connecting the claw 3 to a milk line, and a distributor 5 clamped to the top side of the claw for connecting the cluster, via nipples 5a, to long pulsation tubes (not shown) supplying milking pulses from a pulsator. The teat cups 2 are each composed of a rigid outer shell 6, for example made of stainless steel or plastic, and a flexible liner 7 which has a barrel portion for engaging about a teat, and at its upper end, has a head portion 8 with a mouth through which the teat is engaged with the barrel of the liner. At the opposite, discharge end 9 of the teat cup, the liner is integral with a flexible short milk tube 10 connecting the teat cup to nipples 11 on the top of the claw so that milk extracted from an animal's teats is delivered to the claw 3 from which the collected milk is supplied via the long milk tube to the milk line.

An annular space (not shown) between the shell 6 and the barrel of the liner 7 of each teat cup is called the pulse chamber and is connected via a short pulse tube 12 to the distributor 5 on the claw, via which vacuum and atmospheric pressure fed from the pulsator is automatically and alternately supplied to the pulse chambers of the four teat cups in order to flex the liners and stimulate milking of the engaged teats.

The short milk tubes 10 have weaker sections 13 at positions immediately above the nipples 11 connecting the short milk tubes to the claw so that, when a milking cycle is terminated, which is detected via a milk flow meter of the stall control unit as a reduction of milk flow below a predetermined level, an automatic cluster remover attached to the loop 14 of the cluster support 15, is signalled to take off the cluster from the cow's udder, whereupon the teat cups naturally fall into a position in which they hang downwardly from the short milk tubes 10, in an inverted position, with their heads 8 downwardly, as illustrated in FIG. 1. When the teat cups fall into this downwardly hanging position, the short milk tubes are folded about their weaker sections 13 which serve to shut-off the short milk tube 5 and liner 7 from the claw 3 and prevent treatment fluid sprayed upwardly into the liners, as hereinafter more fully described, from contaminating the claw.

Disposed internally of the head 8 of each liner 7 is an injection nozzle (not shown) for injecting treatment fluid internally into the liner. It is designed so as to direct fluid sprayed from the nozzle inwardly and towards the interior of the barrel of the liner. These nozzles are supplied with treatment fluid for sanitizing the teats, upon take-off, and disinfecting and rinsing the teat cups when the latter fall into their downwardly hanging position, by small diameter flexible tubes 16 connected to a treatment fluid distributor 17 clamped to the top of the claw underneath the pulse distributor 5. Referring also to FIGS. 2-6, each stall control unit has two fluid delivery lines connected to inlets 18 of the distributor 17 via nipples 19. One delivery line, which is connected to the uppermost nipple 19 as drawn in FIG. 3 and which is provided with a non-return valve, supplies disinfectant and conditioning liquid, for example iodine and emollient, for sanitizing the teats of a cow, post milking, whilst a second delivery line, which is connected to the lowermost nipple 19 as drawn in FIG. 3, supplies disinfectant for the teat cups, water or other rinsing fluid and high and low pressure compressed air. These treatment fluids supplied to the inlets 18 of the distributor 17 are distributed by the distributor to individual outlets 20 having nipples 21 for connecting the outlets to the small diameter fluid delivery tubes 16.

The distributor 17 is a moulded plastic body 22 comprising two mutually parallel inlet passageways 23 extending from the inlets 18 in the longitudinal direction of the distributor body and exiting into the first of two mutually parallel transverse passageways 24, 25. The second transverse passageway 24 is connected to two mutually parallel outlet passageways 26 extending in the longitudinal direction of the distributor body and each communicating with two distributor outlets 20 and their associates nipples 21 on the adjacent side.

Formed between the inlet passages 23 is a safety valve comprising a valve bore 27 extending in the longitudinal direction of the distributor body and slidably mounting a valve body 28. The valve bore intersects the transverse passageways 24, 25 and forms a valve port 29 between the first and second transverse passageways. Axially spaced along the bore 27 towards the outer end of the bore is a second valve port 30 outwardly of which the bore connects with a bleed hole 31 formed through the distributor body and venting to atmosphere. The valve body 28 has a double valve member having back-to-back valve surfaces 32, 33 which are selectively engageable with a valve seats about the port 29, in order to shut off fluid flow between the two transverse passageways 24, 25 and with a valve seat 38 about the port 30 in order to shut-off fluid flow to the bleed hole 31. The valve surface 32 incorporates a valve seal 39.

The valve body 28 slidably engages with a narrow section 36 of the bore 27 axially outwardly of the bleed hole 31 and is sealed therein for sliding movement by an O-ring 37. The valve body 28 has a piston 40 located at its axial outer end and engaging the valve bore 27. This piston is actuated to slide the valve body axially outwardly of the valve bore by compressed air supplied via a pneumatic tube connected to a nipple 41 communicating with a pneumatic passageway 42 extending longitudinally above the valve bore 27, and communicating with the latter, via a port 43, inwardly of the piston. The valve body is resiliently urged into a rest position in which the valve member 32 shuts the valve port 29 to shut-off connection between the first and second transverse passageways 24, 25 (see FIGS. 3 and 4) by a cylindrical compression spring 44 mounted on the valve body between the valve member 33 and a shoulder of the narrow section 36 supporting the valve body.

The distributor body 22 is clamped to the top of the claw 3 by the clamping screw 45 projecting through an aperture 46 in the distributor body. Aperture 47 in the distributor body is an indexing hole engagable with an indexing pin projecting upwardly from the claw 3 and preventing turning of the distributors.

Plugs in the form of stainless steel balls 48 are forced into the open ends of passages 24, 25 and 26 to seal the open ends. Alternatively, another method of plugging the open ends of the passages 24, 25, and 26 may be used, such plastic plugs. The use of plugs for the ends of the passages means that the passages can be easily manufactured, for example by drilling through the plastic body 22, rather than needing to mould them.

When the milking cluster 1 is attached to the teats of a cow for milking, the teat cups 2 are moved from the position illustrated in FIG. 1 to a position in which the head portions 8 are uppermost and are fitted over the teats. Milking is stimulated by applying pneumatic pulses to the pulse chambers of the teat cups 2 via the pulse distributor 5, the pulses being alternately applied to pairs of the teat cups. During the milking cycle, pneumatic pressure is removed from the pneumatic tube 42 of the distributor and the valve body 28 remains in its rest or unactuated position shown in FIGS. 3 and 4 in which the valve member 32 shuts the valve port 29 between the two transverse passageways 24, 25, and the valve member 33 opens the valve port 30 so that, during the milking cycle, the bleed port 31 is in communication with the distributor inlets 18, via the first transverse passageway 24 and, should there be a malfunction in the system, disinfectant and other treatment fluids may vent to atmosphere through the bleed port 31.

When the milking cycle is terminated, which is detected by a milk flow meter of the stall control unit as a reduction of the milk flow below a predetermined level, the automatic cluster remover is signalled to take-off the cluster 1 from the cow's udder and, also, the programmable electronic circuit board of the stall control unit or a central control for all stall units is signalled to commence a cleansing cycle.

Figure 5:
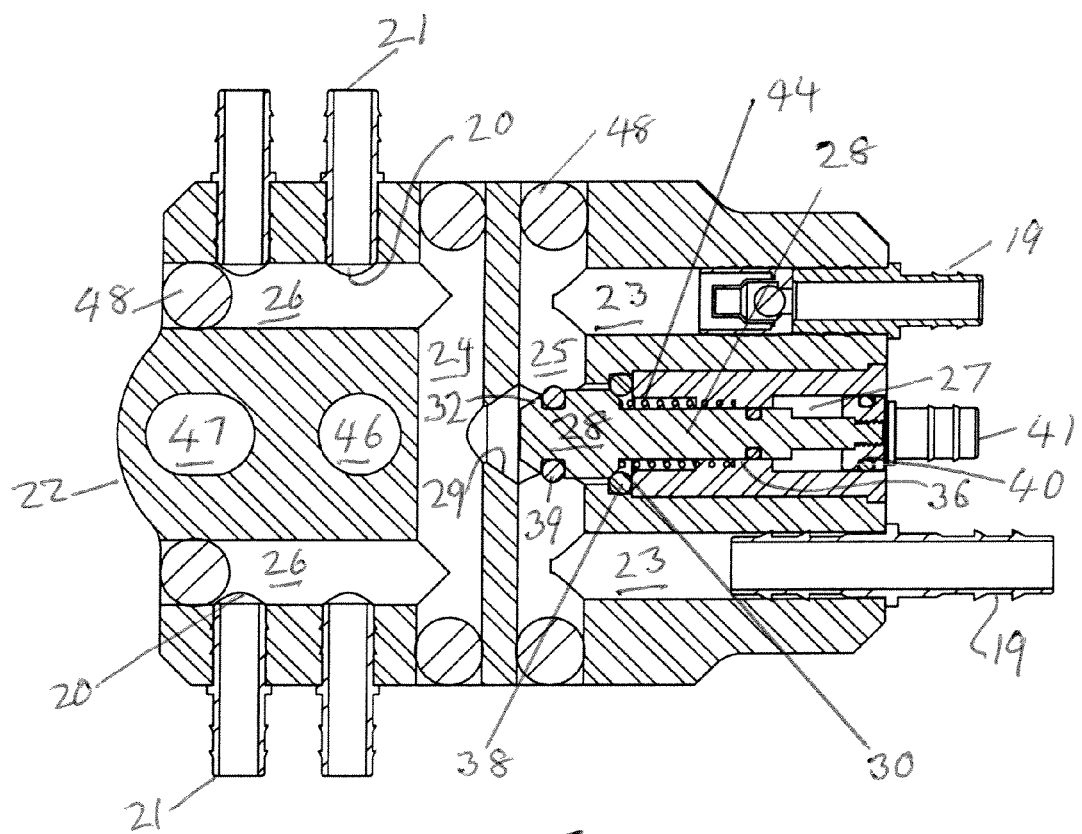
FIGS. 5 and 6 are sectional views taken along the lines A-A and B-B of FIG. 2, respectively, with the safety valve shown in the actuated or open position.
Figure 6:
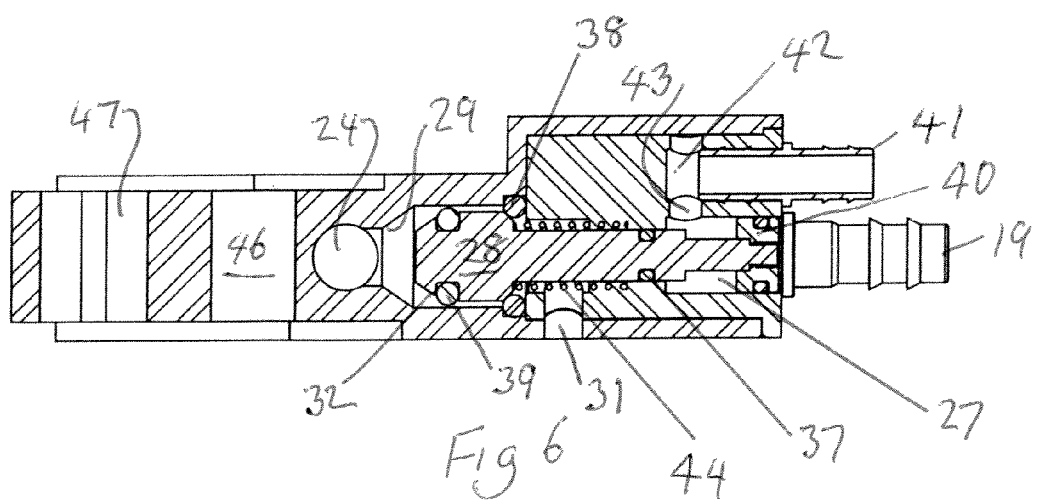

Following an optional preselected time delay at the start of the cleansing cycle, for example to permit vacuum within the liners of the teat cups to decay, the valve controlling application of pneumatic pressure to the nipple 41 and pneumatic passageway 42 is actuated to supply compressed air to the passageway and cause the piston 40 of the valve body to slide the valve body to the right, as viewed in FIGS. 3-6, thereby opening the valve port 29 between the transverse passages 24, 25 and closing the valve port 30 leading to the bleed port 31, as shown in FIGS. 5 and 6. Disinfectant and other treatment fluid is then able to flow from the distributor inlets 18 via the transverse passageway 25, the valve port 29 and the transverse passageway 24 to the outlet ports 20 under the selective actuation of solenoid operated valves controlled by the programmable electronic circuit board of the associated stall control unit.

At the end of the cleansing cycle, the solenoid valve controlling the flow of compressed air to the pneumatic passageway 42 is deactivated to remove compressed air from the passageway, and the valve body 28 moves to the left under the action of the return spring 44, thereby opening the valve port 30 and closing the valve port 29 preparatory to commencement of the next milking cycle.

Figure 3:
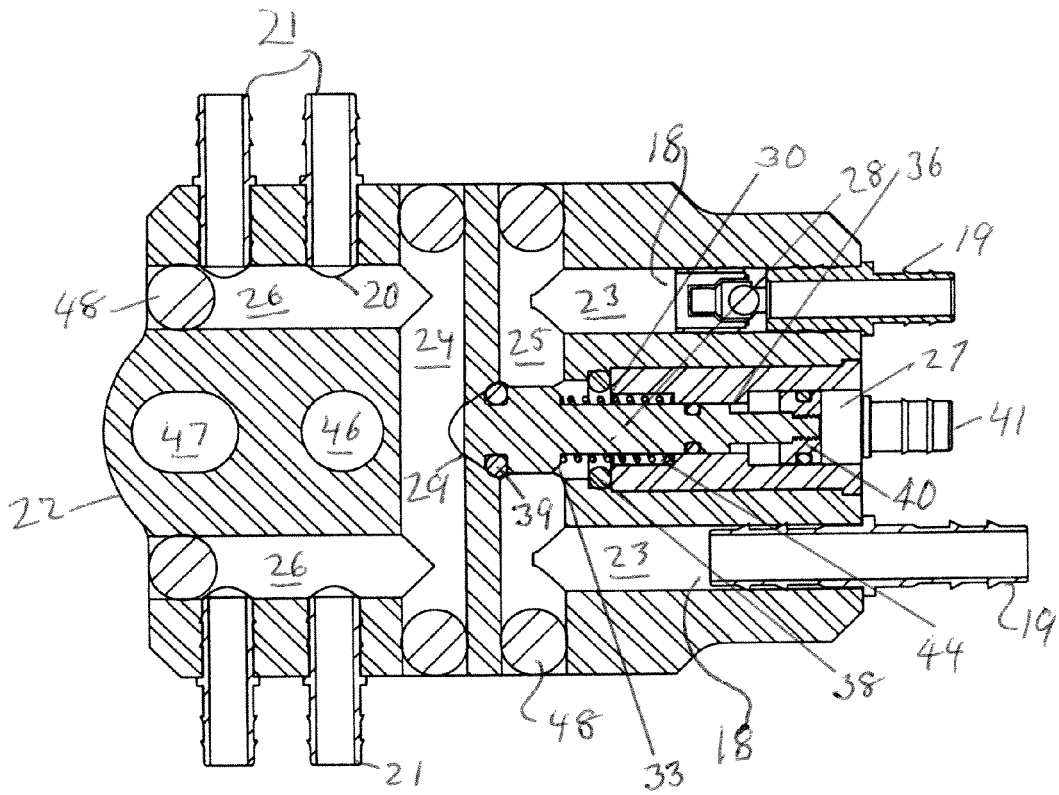
FIGS. 3 and 4 are sectional views taken along the lines A-A and B-B of FIG. 2, respectively, with the safety valve shown in the unactuated or rest position.
Figure 4:
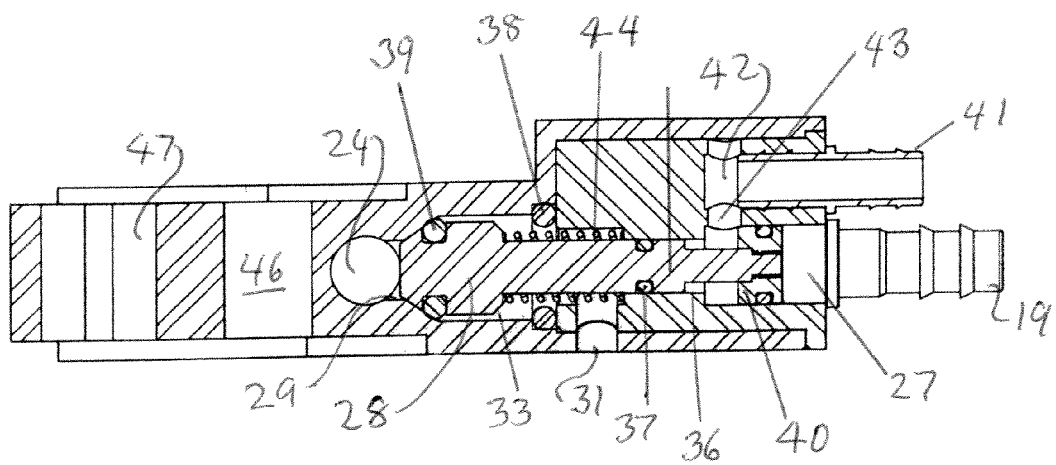

A final optional step at the end of the cleansing cycle, after the valve body 28 has moved to the left under the action of the return spring 44, is to supply a shot/blast of water or cleaning fluid via the second delivery line to the lowermost nipple 19 as drawn in FIG. 3, to flow through the valve port 30 and out of the bleed port 31, to help ensure that the valve port 30 and the bleed port 31 are kept clean and free of debris. The shot/blast of water or cleaning fluid may be followed by a shot/blast of compressed air, also from the second delivery tube connected to the lowermost nipple 19 as drawn in FIG. 3, to dry the valve port 30 and the bleed port 31.

Whilst a particular embodiment has been described, it will be understood that modifications can be made without departing from the scope of the invention. For example, various parts of the specific embodiments described herein may be omitted in alternate embodiments.

In particular, the O-ring seal 37 could be replaced with a lip seal between the narrow section 36 of the bore 27 and the valve body 28, to help reduce friction. The lip of the seal would be angled away from the valve port 29, to help prevent compressed air from the passageway 42 moving past the lip of the seal in the direction of the valve port 29. Alternatively, the O-ring seal 37 could be entirely omitted, and the narrow section 36 and the valve body 28 could be formed with close tolerances such that there was little room between them for compressed air to pass by the narrow section 36.

The invention claimed is:

1. A distributor device for distributing treatment fluid to the teat cups of a milking cluster, the distributor device having a body comprising:
   a distributer inlet for treatment fluid;
   four distributor outlets for connection to four respective teat cups;
   a bleed port venting to atmosphere;
   a first passageway interconnecting the distributor inlet and the bleed port;

a second passageway connecting with the four distributor outlets for delivering treatment fluid thereto; and a safety valve, wherein:

the safety valve is selectively operable to permit flow between the distributor inlet and the four distributor outlets;

the safety valve is selectively operable, in a rest position, to shut off flow between the distributor inlet and the four distributor outlets and vent the distributor inlet to the atmosphere;

the safety valve comprises:
(i) a first valve port disposed between the first passageway and the bleed port;
(ii) a second valve port disposed between the first and second passageways; and
(iii) a valve means controlling the first and second valve ports, said valve means opening the first valve port and closing the second valve port in the rest position of the valve means of the safety valve; and the four distributor outlets are connected downstream of the second valve port such that the treatment fluid is outlet from the four distributor outlets only when the second valve port is opened.

2. The distributor device of claim 1, wherein the safety valve is incorporated in the body of the distributor.

3. The distributor device of claim 1, wherein the valve means comprises a movable valve body carrying at least one valve member cooperating with the first and second valve ports.

4. The distributor device of claim 3, wherein the valve means further comprises a return spring arranged resiliently to urge and retain the valve body in the position in which said at least one valve member opens the first valve port and closes the second valve port, thereby shutting off fluid flow to the at least one outlet.

5. The distributor device of claim 3, wherein the movable valve body comprises two back-to-back valve surfaces, one of which is engageable with a valve seat of the first valve port to close the first valve port, and the other of which is engageable with a valve seat of the second valve port to close the second valve port.

6. The distributor device of claim 1, wherein:

the distributor inlet comprises two distributor inlets;

the distributor body further comprises two inlet passageways and two outlet passageways;

the two inlet passageways extend from the two distributor inlets and exit into the first passageway; and the two outlet passageways extend from the four distributor two outlets and connect to the second passageway.

7. The distributor device of claim 6, wherein:

the two inlet passageways are mutually parallel to one another;

the two outlet passageways are mutually parallel to one another; and the first and second passageways are mutually parallel to one another and are transverse to the inlet and outlet passageways.

8. The distributor device of claim 1, wherein:

the safety valve comprises a valve bore extending transverse to the first and second passageways;

the valve means comprises a movable valve body carrying at least one valve member cooperating with the first and second valve ports; and the movable valve body is slidably mounted in the valve bore.

9. The distributor device of claim 1, wherein:

the valve means comprises a movable valve body carrying at least one valve member cooperating with the first and second valve ports; and the movable valve body is pneumatically actuatable.

10. The distributor device of claim 9, wherein the movable valve body comprises a piston that is actuable by compressed air to close the first valve port and open the second valve port.

* * * * *